Dec. 11, 1951     O. E. CONKLIN     2,578,514
FILM REGISTRATION DEVICE
Filed Oct. 2, 1947     3 Sheets-Sheet 2
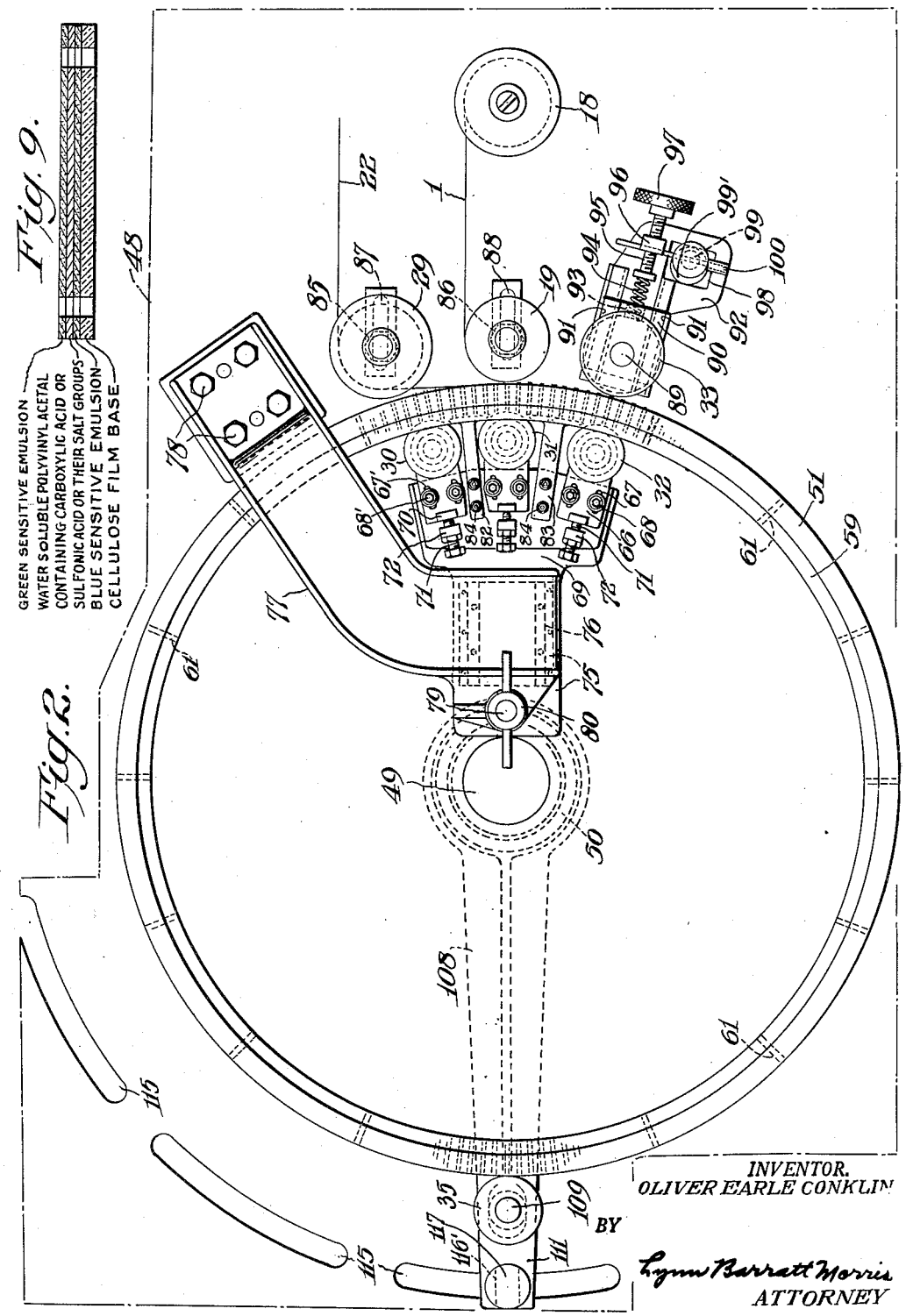
INVENTOR.
OLIVER EARLE CONKLIN
BY
Lynn Barrett Morris
ATTORNEY

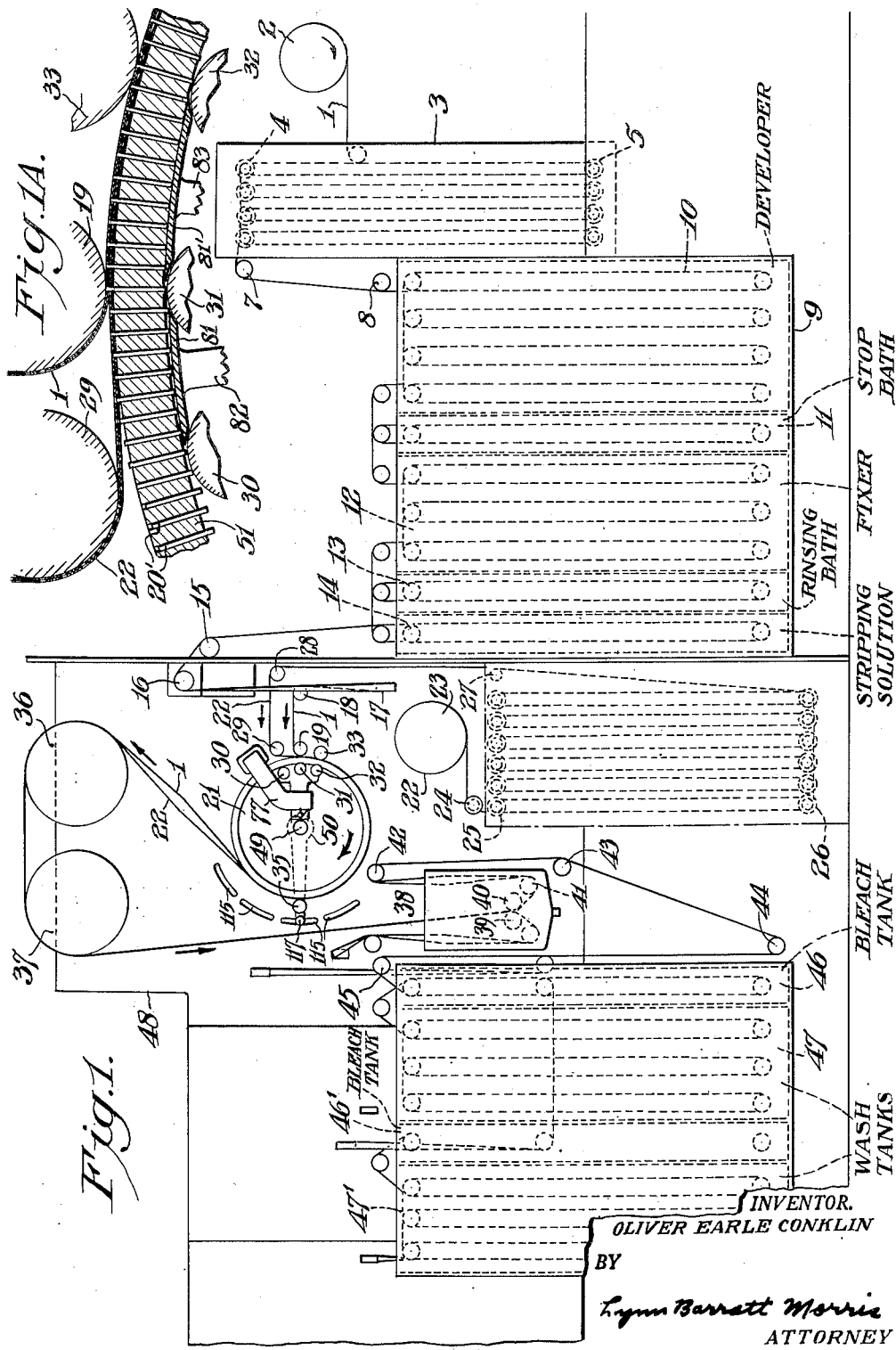

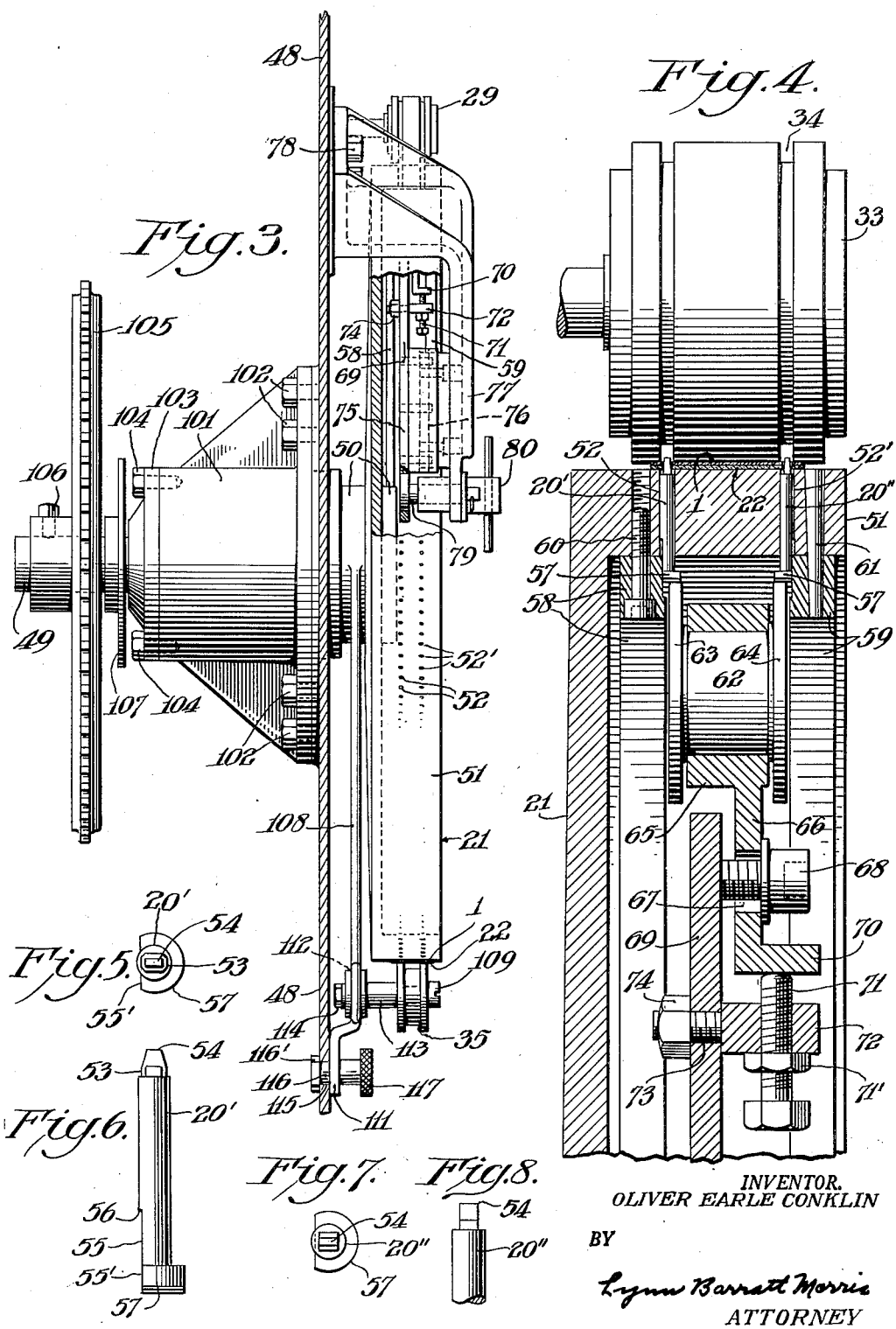

Patented Dec. 11, 1951

2,578,514

UNITED STATES PATENT OFFICE 2,578,514

FILM REGISTRATION DEVICE

Oliver Earle Conklin, Parlin, N. J., assignor to E. I. du Pont de Nemours & Company, Wilmington, Del., a corporation of Delaware Application October 2, 1947, Serial No. 777,472

6 Claims. (Cl. 271—2.3)

This invention relates to photography and more particularly to an apparatus for continuously registering two separate perforated cine films. Still more particularly it relates to a novel registration wheel which is provided with retractable pins for engagement with the perforations of cine films.

Various types of registration wheels and belts for the continuous registration of a plurality of cine films for numerous purposes are known. These wheels or belts usually have teeth or pins in a fixed position. Since it is difficult to attain complete uniformity in such teeth or pins, it is not possible to attain complete and uniform registration continuously in long lengths of cinematographic film in imbibition printing, cementing, dye mordanting, stripping, and related processes.

An object of this invention is to provide an improved registration wheel for the continuous registration of two cine films in exact registration. Another object is to provide such a wheel which can be used for practically any purpose wherein it is desired to bring two cine films into exact registration. A further object is to provide a registration wheel which operates with speed and accuracy in bringing two cine films into registry. A still further object is to provide such a wheel which will not tear or injure the perforations or sprocket holes of the films when they are removed from the wheel after registration has been concluded. Still other objects will be apparent from the following description of the invention.

The novel registration device of this invention in its broader aspects consists of a wheel body having a rim which has uniformly and radially spaced thereon rows of retractable pins which are adapted for engagement in the sprocket holes of two or more cine films which are to be brought together in exact registration. The wheel is provided with means for extending the teeth from the surface of the rim through the perforations of the cine films so that registration of the sprocket holes (perforations) of the two films can be attained. It is also provided with means for retracting the pins after registration has been completed so that the films can readily be removed from the wheel.

The detailed features of a typical embodiment of the registration device and its operation will be more readily understood by a description of the device and its use in a complete apparatus and process for transferring an outer image-bearing emulsion layer from one length of cine film to another cine film continuously and in exact registration. The device and the apparatus are illustrated in the accompanying drawings which form a part of this specification. The parts have the same reference numerals throughout the several views. In the drawings:

Fig. 1 is an elevation of a complete apparatus for processing and transferring an outer emulsion layer of an exposed cine film to a separate cine film support;

Fig. 1A is an enlarged partial section of the registration wheel surface at the point of film feeding and registration;

Fig. 2 is a side elevation of the registration device;

Fig. 3 is an end elevation of the registration device;

Fig. 4 is an enlarged cross-section of the wheel rim and attendant pressure roller and pin-ejecting roller in elevation;

Fig. 5 is a plan view of the full-fitting retractable pins;

Fig. 6 is an elevation of the full-fitting retractable pins;

Fig. 7 is a plan view of the guiding retractable pins;

Fig. 8 is an elevation of the guiding retractable pins; and

Fig. 9 is a cross-section of a stripping film.

Referring now to Fig. 1 of the drawings, an exposed "front" stripping cine film of an extended bi-pack film 1 is unwound from reel 2 and passes into an elevator cabinet 3 which contains a plurality of pulleys 4 and 5 at the top bottom thereof. The lower group of pulleys are mounted on a movable frame member which slides up and down in the cabinet when necessary to thread a new reel of film into the apparatus. By passing the film over eight pulleys as shown, there may be maintained about 200 feet of film in the elevator cabinet.

The film next passes over guide pulleys 7 and 8 into the processing tank 9 which is divided into compartments which are provided with guide pulleys at the top and bottom of each. The exposed film first passes into the developing compartment 10 where it travels up and down over eight pulleys as shown. It then passes over pulleys through an aqueous stop-bath compartment 11 containing water and an acid, e. g., acetic, which arrests the action of the developer. Next it passes up and down over pulleys through fixing compartment 12 and finally passes into rinsing compartment 13. The film as it leaves the latter compartment contains a finished negative picture in each of the original latent image bearing layers of the exposed front film.

The finished film is passed into compartment 14 which contains a "stripping" solution which is adapted to weaken the adhesive bond between the outer image-bearing layer of the front film and the next lower image-bearing layer. A suitable solution consists of water or water and alcohol which solutions may contain a small amount of acetic or lactic acid. This solution, moreover, renders the surface of the film somewhat tacky or adhesive. The film then passes over guide rollers 15 and 16 and then downwardly with a half twist under guide roller 17 which is disposed at right angles to roller 16 and then upwardly with a half twist over guide roller 18 which is disposed at right angles to roller 17 and then over roller 19 where it is fed onto the retractable pins 20 on registration wheel 21. The uniformly spaced perforations or sprocket holes slip onto the pins.

A blank cine support film 22 which is provided with uniformly spaced perforations or sprocket holes is mounted on reel 23 and passes from the reel upwardly and downwardly over guide roller 24 and a plurality of spaced pulleys 25 and 26. The lower group of pulleys may be mounted on a moveable frame or elevator which moves up and down thus permitting the entry of a new reel of blank film without interrupting the continuous operation of the apparatus. The construction of suitable elevator mechanisms is well known in the art. Suitable constructions are shown in United States Patents 1,707,710 and 2,353,219. The pulleys 25 and 26 may be placed in a water tank, if desired, so that the film has substantially the same shrinkage characteristics as the film 1 as it emerges from the stripping solution. The blank cine support film 22 then passes over guide rollers 27 and 28 and then over roller 29 which forces or guides it into contact with and registration on the retractable registration pins 20. The rear surface of blank support film 22 is placed in contact with the wheel. Registration wheel 21 is provided with adjustable rollers 30, 31, and 32 which bear against the heads of the retractable pins. Roller 30 forces the pins part way out where they ride on a guide plate and the sprocket holes are guided onto the extended points of the pins. Roller 31 forces the pins further out so that they engage the perforations of the cine film 1. The perforations of the two films are brought into substantially complete registration at the axis of roller 31. The films are brought into tight and complete registration at the axis of roller 32 and coactive pressure rollers 33. The latter roller is provided with a resilient outer surface, e. g., rubber, and has an annular groove 34 which fits over the pointed ends of the retractable pins. The roller forces the two films tightly against the surface of the wheel whereby they become fastly adhered together in exact registration on the pins. The two films pass around the wheel on the pins in super-position registration to a point where the pins are retracted by means of a roller 35 which presses against the points whereupon they slide inwardly. The roller is preferably adjustably mounted so that the point of retraction can be varied.

The two films with an adherent pass at least 180 degrees around the wheel and are then removed and pass over two large guide pulleys 36 and 37. However, the film is given a 180 degree twist so that the back surface of the blank support film 22 will lie on the support of the guide pulleys. The combined film next passes into a stripping zone or chamber 38 where it passes between two guide pulleys 39 and 40 which have their outer surfaces a slight distance apart. The blank cine support film with its adherent image-bearing layer from the original "front" bi-pack film is stripped from the adjacent image-bearing emulsion layer and adherent support and passes under and over pulleys 41 and 42 whereas the remainder of the bi-pack film passes over pulleys 43, 44, and 45.

After separation the two films can be separately further processed by passing them into a treating tank provided with separate compartments. One compartment may be used for bleaching and another for washing one of the stripped films and two additional compartments may be used for bleaching and washing the second stripped films. Each of the compartments are provided at the top and bottom with guide pulleys similarly to those in the developing and fixing tanks.

The stripped film element bearing the transferred image-bearing layer which passes over pulley 42 can be led over guide rollers 43, 44, and 45 into bleach tank 46 and thence through wash tank 47 and the remaining film element which passes over roller 39 can be passed over a series of guide pulleys into bleach tank 46' and then through wash tank 47' or other suitable tanks.

The structure and operation of the registration device will now be more fully described with reference to the remaining figures of the drawing. This device consists of a frame member 48 which carries a short stub shaft 49 on which is mounted the hub 50 of registration wheel 21. The outer end of the wheel has an outer annular flange-shaped rim portion 51 which has two rows of uniformly spaced holes 52 and 52' which are adapted to receive retractable registration pins 20' and 20" respectively. Pins 20' are full-fitting pins; that is, the base portion 53 immediately below the points 54 completely fill the sprocket holes of the cine films brought into registration thereon. Pins 20" are guiding pins and fill the sprocket holes longitudinally in the cine films but not transversely, there being a little space on each side of the pins between the surfaces thereof and the side edges of the sprocket holes. This allows the full-fitting pins to register the two superposed film elements and permits a slight lateral shift of the film assuring registration of superposed elements. This means each frame of picture is in register on corresponding frames of the blank support on the pins as described above.

Pins 20' and 20" are cylindrical except that the lower portions have a flat portion 55 ending in shoulder 56 and an enlarged head 57 with a flat portion 55' uniform with portion 55. Two annular rings 58 and 59 fit on the inner surface of the wheel rim and are affixed thereto by bolts, e. g., 60 and 61. The rings extend slightly across the holes 52 and 52' respectively and interfit with or bear against the flattened portion 55 of the pins. The shoulders 56 prevent the pins from dropping out because they abut on the annular rings. The pins are forced outwardly by means of rollers 30, 31, and 32 as described above, each of which has the construction shown in Fig. 4. They have a recessed hub portion 62 and two flanges 63 and 64 which abut on the heads 57 of the retractable pins 20' and 20".

Hubs 62 are journaled in adjustable yoke 65 which has an extended arm 66 provided with slots 67 and 67' through which extends locking bolts 68 and 68' which are threadably connected to a fan-shaped plate 69. The outer ends of yokes 65 have right-angle flanges 70 which abut adjusting screws 71 that are threadably disposed in eye bolts 72 which in turn pass through holes 73 in plate 69 and are affixed thereto by means of nuts 74. Adjusting screws 71 are locked in position by means of lock nuts 71'.

An extended shank 75 of plate 69 slidably fits into a flanged guide 76 on the end of bracket arm 77 which is bolted to the frame 48 by means of four bolts 78 as shown. The shank 75 is moved in guides 76 locked into position by means of a bolt 79 with cam attached to its lower end and adapted to function within an opening in the shank. Operation is by means of a wing nut 80. The shank can be slid in and out on the flanged guide of the bracket arm to position the rollers 30, 31, and 32. The guide plates 81 and 81' extend across the inner surface of the wheel and fit closely between the points of tangency of the roller surfaces. These guide plates have arms 82 and 83 which are bolted to fan-shaped plate 69 with bolts 84. The heads of the retractable pins ride on the guide plates and are held in extended position. Guide plate 81' is extended further radially than plate 81 so that the base of the pins will extend completely through the films registered thereon.

Guide rollers 29 and 19 are adjustably fastened to frame 48 by means of bolts 85 and 86 which fit in slots 87 and 88 in the frame. Guide roller 33, however, is mounted on stub shaft 89 which is affixed to a slidable plate 90 which slides in grooves 91 in pivoted bracket 92. The plate has a depressed portion 93 in its center which is adapted to receive a spring 94 which bears against the head of adjusting screw 95 which passes through threaded lug 96. The screw is adjusted by means of knurled knob 97. Bracket 92 has a rectangular opening 98 which receives pivot pin 99 which is fixed to frame 48. This pin has an eccentrically disposed flange 99' which overlaps the surface of the bracket. Adjusting screw 100 which is threadably disposed through the outer wall at the narrow end of the rectangular opening prevents the bracket from coming off the pivot pin.

A combination bearing and bracket 101 is disposed on the opposite side of the frame 48 and is bolted thereto by means of bolts 102. The outer end of the bearing has an annular sealing plate 103 which is fastened by means of bolts 104 to the bearing. The stub shaft 49 on which wheel 21 is fixedly mounted, e. g., by a key and slot, extends through the bearing and flange member and a hole in frame 48. The outer end of the shaft has a driving gear 105 fixedly mounted thereon. It is held in place by means of nut 106 and inner bearing plate 107. The gear is driven by any suitable mechanism and wheel 21 revolves with the gear.

A pivot arm 108 is also mounted on the stub shaft 49 between the wheel's radial wall and the frame 48. It carries a bolt 109 which serves as a bearing for flanged roller 35. The head of the bolt abuts against the end of the roller and is provided with a screw slot 112. A collar 113 surrounds the bolt between the roller and the arm 108. A nut 114 and washer hold the bolt collar and roller in position. The flanges on the roller are disposed so that they will engage with the pointed ends of the retractable pins and cause them to move inwardly. This permits the adherent duplex film element to be led off or removed from the wheel with little force and without injury to the perforations or sprocket holes.

The out end of arm 108 is bent downwardly to meet frame 48 in a flat portion 111. The frame contains arcuate slots 115 through which passes bolt 116 and knurled nut 117 which have co-operating threads (not shown). The head 116' of the bolt rides on the back side of frame 48 and slides in the arcuate slots 115. By varying the position of the arm in the slots, one can change the point at which the pins are retracted from the wheel.

The novel registration device as stated above is not limited in its use to the process specifically described above. On the contrary, it is useful in many processes where it is desirable to continuously superpose in register two perforated cine films. Instead of developing, fixing, and washing the film elements before stripping, the stripping film can be passed into the stripping solution and the outer layer transferred to a blank cine support film and stripped. The separate film elements can then be developed, fixed, washed, etc., in apparatus similar to that described above.

In addition to stripping transfer processes as described above, the registration device can be used in imbibition printing processes. Thus it can be used in place of the revoluble registration drums of United States Patents 1,303,836, 1,303,837, and 1,316,791; the registration pressure rolls of 1,834,355, 1,677,309, and 1,707,710; and for the purposes described in such patents.

Suitable stripping films which can be processed in the above apparatus and on the novel registration device are described in United States patents Potter 2,126,137, Marasco 2,182,814, Verkinderen 2,167,732, Eastman 306,594 and Thornton 1,930,291. An especially useful film is described in Jennings United States application Serial Number 651,996 filed March 5, 1946, now Patent No. 2,462,503, patented February 22, 1949, wherein water-soluble, developer-insoluble adhesive stripping layers are used. A preferred type is shown in Fig. 9 of the drawing.

Suitable stripping solutions for use with the films just described are the following:

Bath #1:

| | Parts by volume |
|---|---|
| Water, distilled | 40 |
| Alcohol, ethyl (95–97%) | 60 |
| Acetic acid, glacial | 1 |

Bath #2:

| | Parts by volume |
|---|---|
| Water, distilled | 30 |
| Alcohol, ethyl (95–97%) | 70 |
| Acetic acid, glacial | 3 |

Bath #1 usually will soften the stripping layer more than Bath #2. However, Bath #2 will anchor the transferred emulsion layer more firmly to the gel blank due to the increased acid content.

Bath #3:

| | Parts by volume |
|---|---|
| Water, distilled | 30 |
| Alcohol, ethyl (95–97%) | 70 |
| Lactic acid, 85% | 2 |

It is generally desirable to have each picture frame of the film maintained in the solution for about 90 seconds. This can be regulated by the size of the stripping solution tank, distance between guiding rollers, and number of the same in the tank.

An advantage of the complete process and apparatus described above is that the registration and stripping operations can be carried out in illuminated zones, thus permitting the operator to carefully observe the registration and stripping continuously.

The registration device has the advantage that the pins can be accurately made uniform and in quantities by machines. The pin manufacture is separate from wheel manufacture. Holes can be drilled accurately in the wheels and the pins made to fit them by choice of proper size.

Another novel feature of the wheel and retractable pins is that the pitch of the pins on the wheel can be changed by simply removing the pins and either plating or grinding the surface of the wheel. The per cent change in lengthwise pitch of the pins equals the per cent increase or decrease in the diameter of the wheel.

As many widely different embodiments of this invention can be made without departing from the spirit and scope thereof, it is to be understood that the invention is not to be limited except as defined by the claims.

What is claimed is:

1. A cine film registration device comprising a revoluble wheel having an annular rim which is provided with two straight rows of small round holes uniformly spaced radially about the rim and extending completely through said rim, retractable cylindrical registration pins in each of said holes, means for extending said pins outwardly beyond the surface of said wheel including rolls which are disposed below the two rows of holes, said pins each being pointed at their outer end and having a flat portion near and extending to the other end, a shoulder at the inner end of said flat portion and a flanged head at the said other end which also has a flat portion coterminous with the flat portion on the body of the pins, spaced annular rings which fit under said rim adjacent to the holes, respectively abut the flat portions of said pins, retain the pins in the holes and coact with said shoulder to limit their downward travel, means for forcing perforated films into contact with the outer surface of the wheel and in register on said pins including a roller which is provided with two spaced annular grooves which fit over the registration pins as they extend beyond the surface of said wheel and a roller for retracting said pins, which is disposed in the paths of the rows of registration pins.

2. A device as set forth in claim 1 wherein said roller for retracting said pins is mounted adjacent the peripheral surface of the revoluble wheel with its axis parallel to the axis of the wheel so that the peripheral surface of the roller engages the pointed ends of the pins and forces the pins into the body of the rim of the wheel.

3. A cine film registration device comprising a revoluble wheel having an annular rim which is provided with two straight rows of small round holes uniformly spaced radially about the rim and extending completely through the rim, retractable cylindrical registration pins in each of said holes, a plurality of spaced rollers disposed underneath the annular rim for forcing said pins outwardly through said holes, said pins each being pointed at their outer end and having a flat portion near and extending to the other end, a shoulder near the inner end of said flat portion and a flanged head at the said other end which also has a flat portion coterminous with the flat portion on the body of the pins, spaced annular rings which fit under said rim adjacent to the holes, respectively abut the flat portions of said pins, retain the pins in the holes and coact with the shoulders on said rims to limit their downward travel, plates between said rollers and in close proximity with the inner surface of said annular rim which engage with the heads of the pins and holds them in extended position, a roller for retracting said pins into said holes mounted adjacent the peripheral surface of the revoluble wheel with its axis parallel to the axis of the wheel so that the peripheral surface of the roller engages the pointed ends of the pins and forces the pins into the body of the rim of the wheel.

4. A cine film registration device comprising a revoluble wheel having an annular rim which is provided with two straight rows of small round holes uniformly spaced radially about the rim and extending completely through the rim, retractable cylindrical registration pins in each of said holes, a plurality of spaced rollers disposed underneath the annular rim for forcing said pins outwardly through said holes, said pins each being pointed at their outer end and having a flat portion near and extending to the other end, a shoulder near the inner end of said flat portion and a flanged head at the said other end which also has a flat portion coterminous with the flat portion on the body of the pins, spaced annular rings which fit under said rim adjacent to the holes, respectively abut the flat portions of said pins, retain the pins in the holes and coact with the shoulders on said pins to limit their downward travel, plates between said rollers and in close proximity with the inner surface of said annular rim which engage with the heads of the pins and holds them in extended position, a roller for retracting said pins into said holes mounted adjacent the peripheral surface of the revoluble wheel with its axis parallel to the axis of the wheel so that the peripheral surface of the roller engages the pointed ends of the pins and forces the pins into the body of the rim of the wheel, a roller for feeding a perforated cine film onto said pins, a roller for feeding a second film onto said pins and a roller for forcing said cine films into contact with the surface of the wheel and in register on said pins, said roller being provided with two spaced annular grooves which fit over the rows of register pins.

5. A device as set forth in claim 4 wherein the roller for forcing the film and the rollers for forcing the films into contact with the wheel are in close proximity and the roller for retracting the pins is disposed a substantial distance around the periphery of the wheel from said first rollers.

6. A device as set forth in claim 5 wherein the rollers for forcing the pins outwardly are each adjustably mounted on a single plate which is adjustably mounted on a supporting bracket and the remaining rollers are adjustably mounted on separate supports, the roller for retracting said pins being adjustable around the circumference of the wheel, said bracket and said separate supports being mounted on a common frame.

OLIVER EARLE CONKLIN.

REFERENCES CITED

The following references are of record in the file of this patent:

UNITED STATES PATENTS

| Number | Name | Date |
|---|---|---|
| 1,189,263 | Krauth | July 4, 1916 |
| 1,303,837 | Wyckoff | May 13, 1919 |
| 1,898,141 | Piper | Feb. 21, 1933 |
| 2,102,651 | Sherman et al. | Dec. 21, 1937 |
| 2,257,254 | Whittaker | Sept. 30, 1941 |